United States Patent [19]
Sannipoli

[11] 3,734,387
[45] May 22, 1973

[54] TANK FABRICATION SYSTEM

[75] Inventor: Alfred L. Sannipoli, Escondido, Calif.

[73] Assignee: Lyco Manufacturing, Inc., Escondido, Calif.

[22] Filed: May 18, 1971

[21] Appl. No.: 144,532

[52] U.S. Cl. .......................... 228/6, 29/484, 228/44, 228/48
[51] Int. Cl. .............................................. B23k 5/00
[58] Field of Search .................. 29/484; 113/120 QA; 228/6, 44, 48; 219/62, 6, 59

[56] References Cited

UNITED STATES PATENTS

| | | | |
|---|---|---|---|
| 3,634,648 | 1/1972 | Morris et al. | 228/48 X |
| 3,480,158 | 11/1969 | Pandjuris et al. | 214/1 |
| 2,944,449 | 7/1960 | Wheeler et al. | 228/6 |
| 2,758,367 | 8/1956 | Dougherty | 228/48 X |
| 2,753,826 | 7/1956 | Dougherty | 113/59 |
| 1,907,702 | 5/1933 | Anderson | 228/48 X |
| 1,740,033 | 12/1929 | Pinckney | 228/48 X |

FOREIGN PATENTS OR APPLICATIONS 1,955,761  11/1968  Germany ............................ 228/48

*Primary Examiner*—J. Spencer Overholser
*Assistant Examiner*—Robert J. Craig
*Attorney*—Carl R. Brown and Neil F. Martin

[57] ABSTRACT

A system and method of fabricating tanks comprising a plurality of carriages mounted on tracks and supporting tank sections and a chain drive mechanism for forcing the tanks into contacting relationship. Also included is a hydraulic ram for applying further contacting pressure so that intimate contact is established between adjacent sections. If the sections are supplied with the flanges, flanges are forced within the flange receiving portions of adjacent sections. The carriages contain provision forcing the tank section to assume a more perfectly circular, cross-section and for rotating the entire assembly after it is structurally joined by a series of tack welds. The final seam weld is made with an automatic welder over the entire circumference of the joint between each adjacent section as the tank is rotated.

1 Claim, 9 Drawing Figures

Patented May 22, 1973

INVENTOR.
ALFRED L. SANNIPOLI
BY Brown & Martin
ATTORNEYS

Patented May 22, 1973

INVENTOR.
ALFRED L. SANNIPOLI
BY Brown & Martin
ATTORNEYS

Patented May 22, 1973 3,734,387

INVENTOR.
ALFRED L. SANNIPOLI
BY Brown & Martin
ATTORNEYS 3,734,387

TANK FABRICATION SYSTEM

BACKGROUND OF THE INVENTION

Multiple requirements exist for storage tanks for the storage of fluids and gases, such as petroleum products, either in underground storage or above ground. In addition, there are requirements for mobile tanks, such as on over the road vehicles, for carrying a wide variety of fluids including molasses, water and many other gaseous or liquid consumables. Frequently these tanks are of such a size that the expense of their shipment from a central production facility is prohibitively high. Thus it is necessary to produce such tanks at a location relatively close to the location of eventual use. The tanks can then be made up of sections which are of sufficiently small size to make over the road shipment practical.

The conventional fabrication technique for these tanks has been to roll a sheet into a shell of generally circular configuration and weld the two opposing ends. The sheets are normally obtained with flange and flange receiving portions on their opposite sides and in the final configuration the tank is comprised of a plurality of these rolled sections inserted one in the other and then welded to form a leak proof tank. However, the formation of these tank sections by the process of rolling flat sheets is subject to irregularities and the resulting sections are normally slightly out of round. As a consequence it is very difficult to force the adjacent sections to fit, one within the other. In prior art systems a first section is placed on a horizontal surface and a second section lowered onto the first, whereupon the opposing sections are man-handled, with a lever like device, similar to a crow bar, so as to expand the flange over the flange receiving portion. This process is extremely time consuming, and leads to the poor utilization of materials, since some of the sections are so malformed as to be unusable by this technique. Further, after the sections are forced together it is then necessary to move the tank structure, tack welded to retain its configuration, to a separate seam welding facility. There, an automatic welding device is utilized to make the finished welds.

Thus it would be desirable if a more efficient fabrication system could be designed, to reduce the man hours and the number of operations associated with the fabrication of tanks.

SUMMARY OF THE INVENTION

In an exemplary embodiment of the invention the tanks are formed by a process and apparatus which effects the efficient production of tank structures.

The system of the invention utilizes guide means comprising two parallel tracks. The tracks support a plurality of carriages as a means for moving and supporting tank sections. One carriage is utilized for each tank section necessary to produce a tank of the desired length. The carriages support circularizing and supporting members, which are arranged to be capable of forming two opposed semi-circular sections having an inside radius corresponding to the outside diameter of the tank being fabricated. Tank sections, made by the rolling and welding process, are placed on the carriages. Upper segments are forced by power means into their semi-circular configuration and thereby the tank sections are forced to assume a more perfectly circular configuration.

There is a means for moving and holding said section in contact consisting of an endless chain mounted beneath the track structure and is engageable with a member extending from a movable end carriage located on the tracks. With the end carriage engaging the chain, and the chain being driven, the carriage will be forced to move in the same direction as the upper surface of the chain. The end carriage carries an end stop and a means for supporting the end plate as well as a hydraulic ram. Opposite the stop carriage is a fixed stop which is also adapted to support an end plate.

When the chain is driven to force the movable end stop into engagement with the first tank section, the sections are forced progressively along the track until they reach the fixed stop. The chain is then stopped and the hydraulic ram actuated, to force the successive sections into intimate contact, and to force the flange of one section into the flange receiving portion of the succeeding section if the sections are so provided. This contact and nesting of the successive sections is made possible by the circularizing action of the craddling means which have forced the sections to assume a configuration which is sufficiently close to a perfect circle to ensure that adjacent sections will fit one within the other.

When all the sections have been moved into correct position, a series of tack welds are made by, for example, a hand welder, at spaced intervals around the periphery of the tank sections. In addition, tack welds are made between the end plates and the tank sections to form a complete tank. It is then possible to remove ram pressure and back off the movable end stop. The upper semi-circular members are released and means on the carriages actuated to raise the sections out of engagement with the lower semi-circular members.

Each carriage is provided with a plurality of rollers which contact and force the sections to the raised position to make it rotatable. One or more of the rollers, on one or more of the carriages, is powered so as to make it possible to drive the entire tank into rotation. The rate of rotation is variable and is utilized to controllably rotate the tank under the head of an automatic welding machine to produce a continuous seam weld around the periphery of the tank, at all of the tank joints.

It is therefore an object of the present invention to provide a new and improved tank fabrication system.

It is another object of the invention to provide a new and improved tank fabrication method.

It is another object of the invention to provide a new and improved tank fabrication system which reduces the manual labor necessary for the production of tanks.

It is another object of the invention to provide a new and improved tank fabrication system which provides the structure for combining all tank fabrication operations at one location.

It is another object of the invention to provide a new and improved tank fabrication system which makes it possible for all of the tank sections making up a tank to be brought into their final configuration in a single operation.

It is another object of the invention to provide a new and improved tank fabrication system which enables all of the operations to be performed on the tank being fabricated while that tank is in a horizontal orientation.

It is another object of the invention to provide a new and improved tank fabrication system which makes it possible to utilize tank sections which are sufficiently out of round to cause their rejection by other methods.

Other objects and many attendant advantages will be apparent from a reading of the following detailed description together with the accompanying drawings in which like reference numerals refer to like parts throughout and in which.

Figure 1:
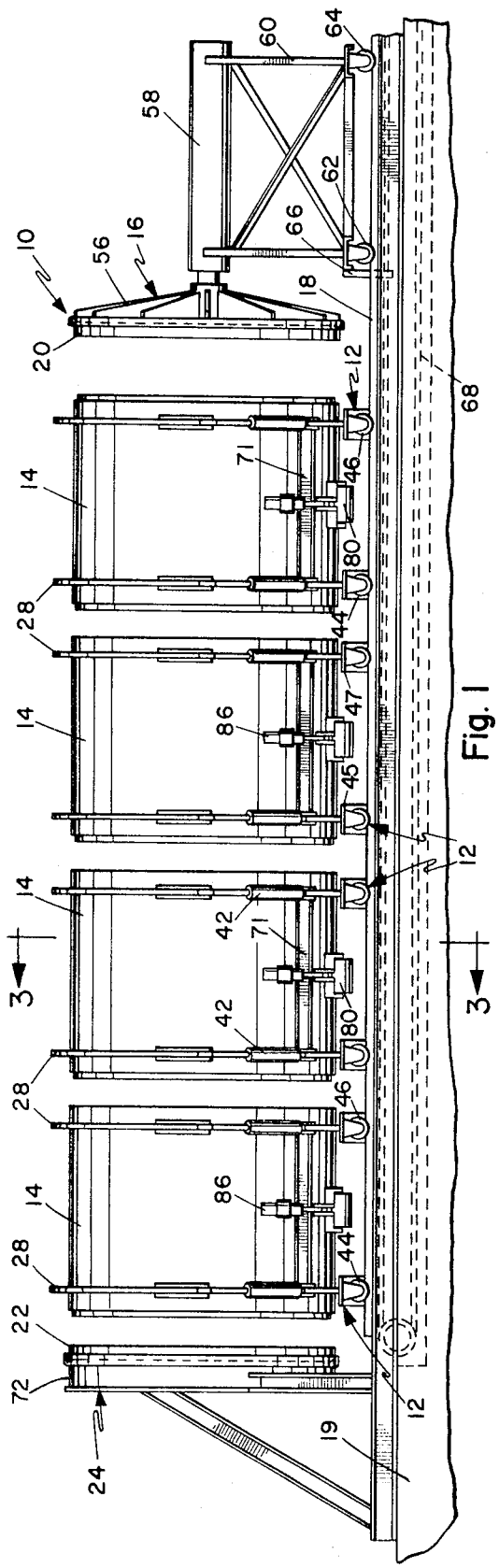
FIG. 1 is a side elevational view of the tank fabrication system of the invention.

Referring now to FIGS. 1 through 4 of the drawing, there is illustrated an exemplary embodiment of the invention. The figures illustrate a tank fabrication system indicated generally by the numeral 10 and including a plurality of carriages 12 supported on tracks 18 and carrying a plurality of generally circular tank sections 14. The tanks are arranged in axial alignment by virtue of their placement on the carriages and the tracks and therefore are also in axial alignment with end plates 20 and 22 carried by the movable stop means 16 and the fixed stop means 24 respectively. The entire structure is carried on a concrete base 19.

The carriages utilized are sized for the particular tank section being fabricated. Each carriage is supported on front and rear pairs of track engaging wheels 44 and 46. The lower frame member 26 is secured to the wheels supporting flanges 45 and 47 and has a generally semi-circular upper surface 27. Opposed to the surface 27 is the upper semi-circular section 28 which comprises a plurality of sections 30, 32 and 34 so that the upper semi-circular section may be broken down for installation of the tank sections and for the welding operation to be described hereinafter. The broken down operation is best illustrated in FIG. 4. The two halves of the semi-circular section are maintained in an abutting relationship with a fork member 33 receiving the end portion of arm 32. Prior to locking the tank section in place the arm 32 is rotated so as to bring hole 51 into alignment with hole 53 and a pin (not shown) inserted therethrough to hold arm 32 in alignment with the remainder of the segment 34. This configuration provides clearance for the welding arm 107 and also makes removal of the tank sections after welding easier. If desired, or required by the weight of the semi-circular sections, the arm 32 may be hydraulically actuated between its retracted position, illustrated in FIG. 4, and the extended position illustrated in FIG. 3.

As can best be seen in FIG. 1, each carriage 12 has a plurality of the pairs of semi-circular members and therefore provides support and circularizing efforts for both ends of the sections. The opposite ends of the carriage are interconnected by beam members 70 and 71.

Figure 3:
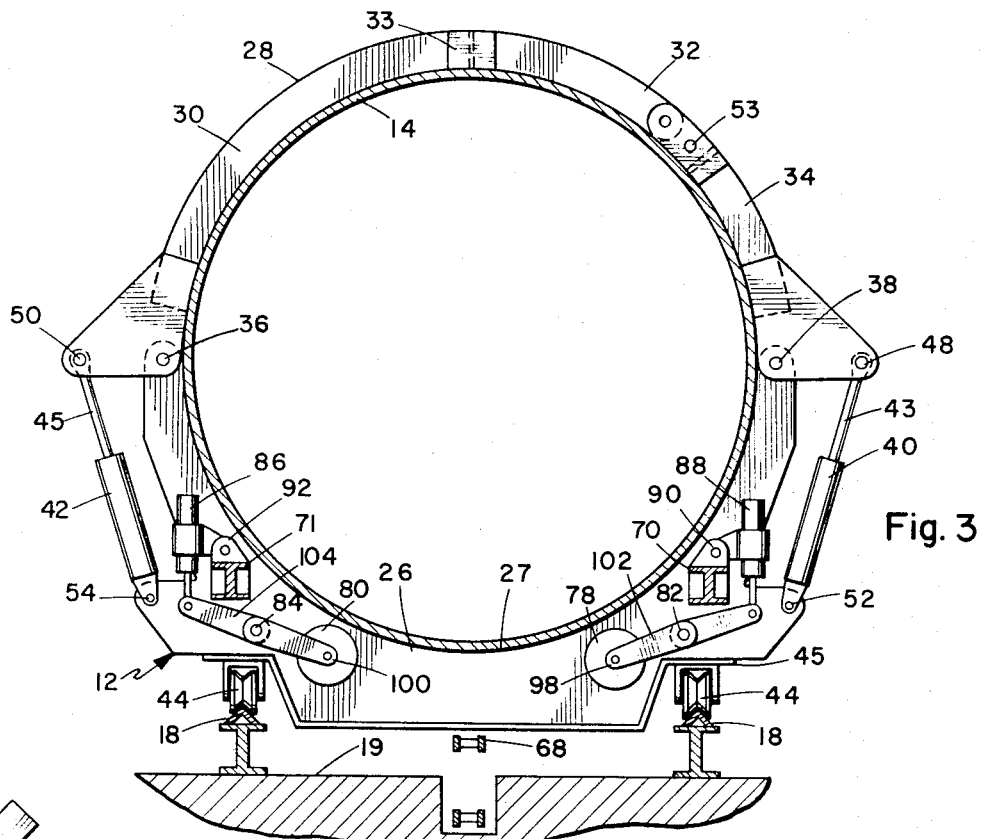
FIG. 3 is a sectional view taken along lines 3—3 of FIG. 1.
Figure 4:
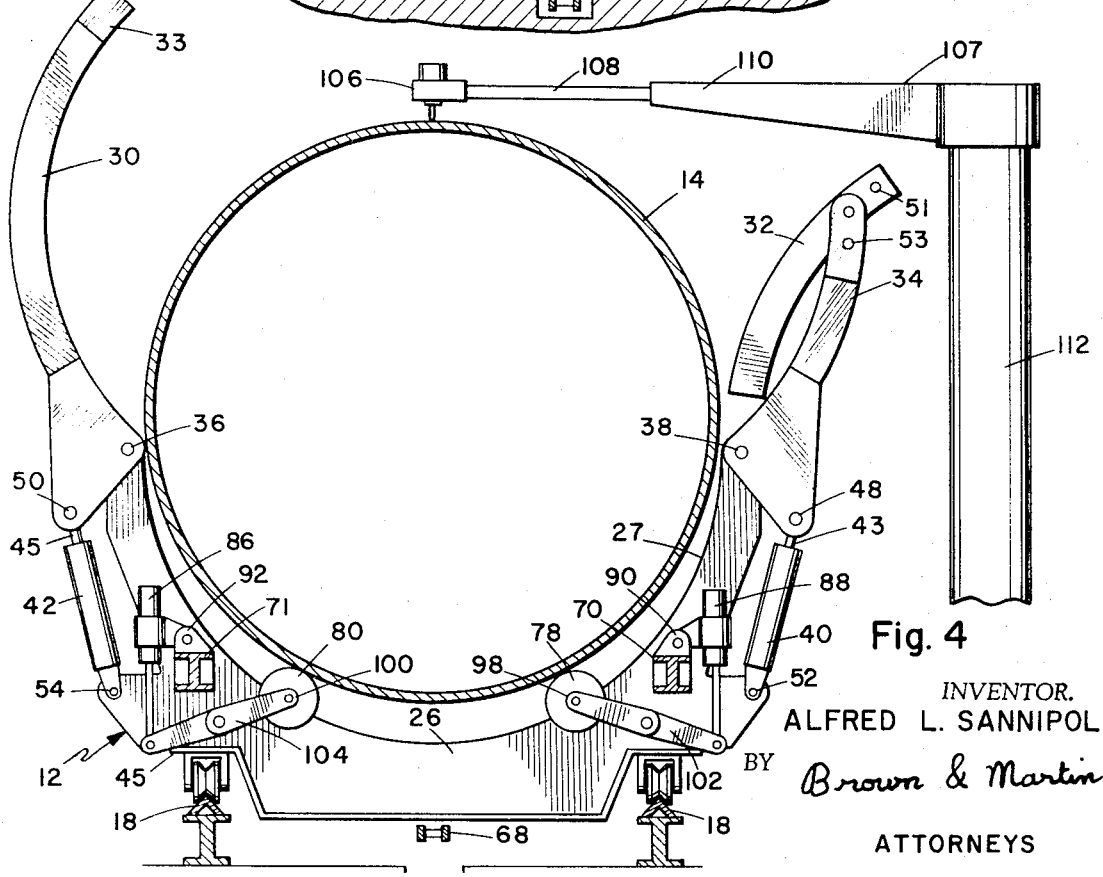
FIG. 4 is a sectional view similar to that in FIG. 3 but showing the mechanism in position for welding.

The upper segments are forced into the semi-circular configuration of FIG. 3 by hydraulic cylinders 40 and 42. The cylinder 40 is mounted at its lower end by pivot 52 and its upper end by pivot 48. When hydraulic pressure forces extension of the cylinders piston rod 43 the segment is forced towards the closed position of FIG. 3 by pivoting about pivot 38. Similarly, cylinder 42 is mounted at its lower end by pivot 54 and at its upper end by pivot 50. When hydraulic pressure forces the extension of piston rod 45 the segment 30 is forced towards its position in FIG. 3 by pivoting about pivot 36.

Figure 2:
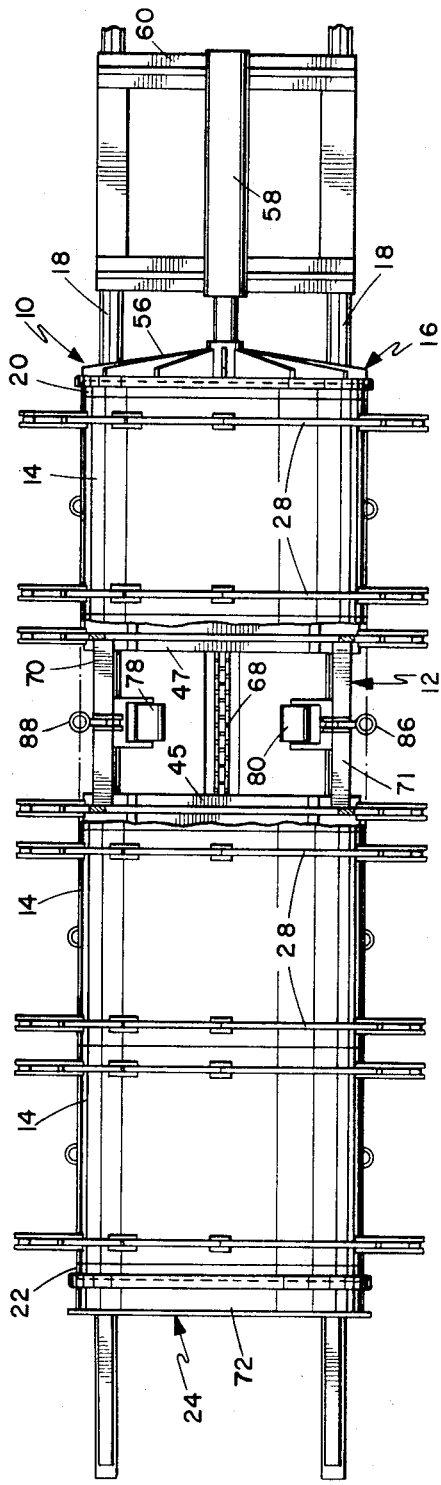
FIG. 2 is a top view partially broken away to illustrate the positioning of the roller and track mechanisms.

FIG. 1 shows four tank sections that are installed in the craddles of the invention and are therefore more perfectly rounded than in the originally formed condition, as will be more fully described hereinafter. The apparatus of the invention that forces the sections in this condition into intimate contact as illustrated in FIG. 2 includes the carriage 16 utilizing wheel pairs 62 and 64 to support a hydraulic ram 58 mounted on frame 60. The hydraulic ram carries an end plate supporting flange and stop member 56 which is movable axially of the tank sections under the influence of hydraulic pressure delivered to the cylinder 58 by hydraulic lines (not shown). The carriage 16 is initially positioned through the use of the chain 68 which is driven by a source of power (not shown) to successively engage the end plate with the first tank section and then with succeeding tank sections. The carriage is drawn by the chain due to the chain engaging member 66 which depends vertically from the frame 60 into engagement with the chain. When movement of the chain becomes blocked by contact of the last section and the supporting flange 72 of stop member 24, the hydraulic ram is brought into action to compress the sections to the configuration illustrated in FIG. 2.

With the tank sections properly oriented a plurality of tack welds are made around the periphery of each joint between adjacent tack sections and/or the end plates. These tack welds are of sufficiently close spacing, for example 18 inches, to obtain sufficient strength to make the structure self-sustaining. When the structure has been made self-sustaining it is ready for finish welding. At this point the upper semi-circular member is released and pins removed from the holes 51 and 53.

The structure for raising the tack welded tank to position for final welding is best illustrated in FIGS. 3 and 4 and includes a pair of hydraulic cylinders 86 and 88 pivotally mounted on bearings 92 and 90 respectively. The output shaft of these cylinders is connected to lever arms 102 and 104 by bearings 96 and 94. The lever arms are mounted for pivoting movement on bearings 82 and 94 and pivot between the positions illustrated in FIG. 3, where the rollers 78 and 80, mounted on bearings 90 and 100, are out of contact with the tank sections surface to a position illustrated in FIG. 4, where the rollers have been forced into engagement with the tank sections surface, and have caused an elevation of the tank sections raising the tank section out of contact with the lower semi-circular section.

With the tank raised to the position illustrated in FIG. 4, it is free to rotate, and may be caused to rotate by driving in rotation one or more of the rollers 78 or 80. These rollers may be driven by, for example, a variable speed motor (not shown). Thus it is possible to rotate the joint of the weld underneath the welding head 106 supported on extendable arm 107 comprising an outboard section 108 and an inboard section 110. Vertical support is provided by column 112.

The operation of the system and method of the invention is best visualized by reference to FIGS. 5a through 5d. Tank sections illustrated by the three representative sections 14 are made up in advance by a process involving the successive rolling of flat sheets until the formerly opposed ends of the sheets are in contact, or nearly in contact, whereupon the opposed ends are joined by welding. It is most expeditious, when practicing the invention, to utilize flat sheets that already have flanges and flange receiving portions. The flat sheets may be singly flanged such as the sheet making up the tank section 120 in FIG. 5a which has a single flange 122 or double flanged as illustrated in the tank section of FIG. 5a, referred to by numeral 124, which includes flanges 126 and 128. By utilizing double flanged flat sheets it is possible to incorporate end plates 20 and 22 which have flange receiving portions only.

The pre-fabricated shells or tank sections are then loaded onto a sufficient number of carts, placed on the tracks 18. In the case illustrated, three carts are employed to carry three tank sections. After the sections are loaded on the carts, the upper semi-circular members are forced to the position illustrated in FIG. 5a. This involves first extending the foldable arm 32, to align it with arm 34, and to hold the arm in position with a pin through holes 51 and 53 so that the arm assumes a configuration generally opposite to that of arm 30. The hydraulic cylinders 40 and 42 ar then actuated so as to force the upper segment into contact with the upper surface of the tank section and cause it to assume the configuration of the arms themselves, that is circular in total effect. Thus any irregularity present in the fabricated tank sections is compensated for the pressure maintained on the sections by the hydraulic cylinders. The hydraulic cylinders are maintained in their activated state while the end plate 20 is advanced on carriage 16 under the influence of the chain 68 so as to contact and engage flange 128 in particular, and tank section 14 in general, and to force that section into are adjacent section until the last section contacts end plate 22, whereupon the drive to the chain would be discontinued, and the chain locked in position.

Figure 5A:
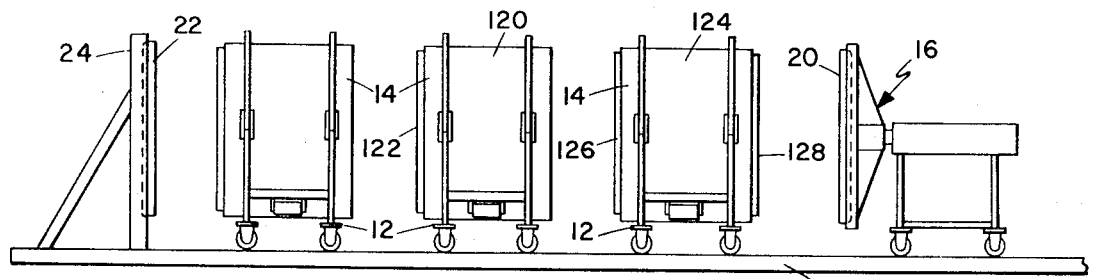
FIGS. 5a through 5d illustrate the steps in the method of fabricating tanks according to the invention.
Figure 5B:
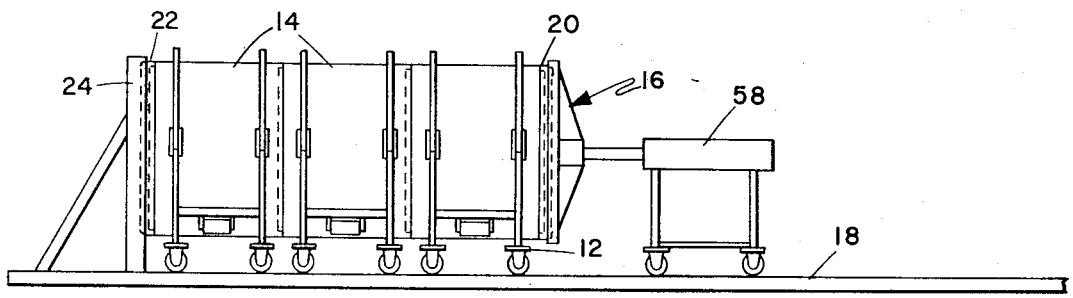
Figure 5C:
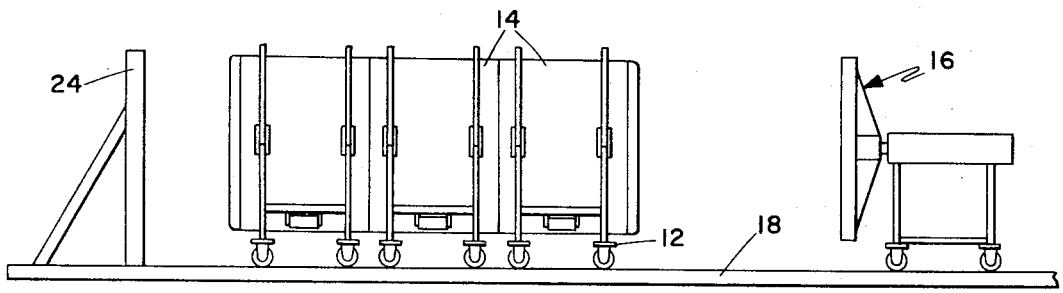
Figure 5D:
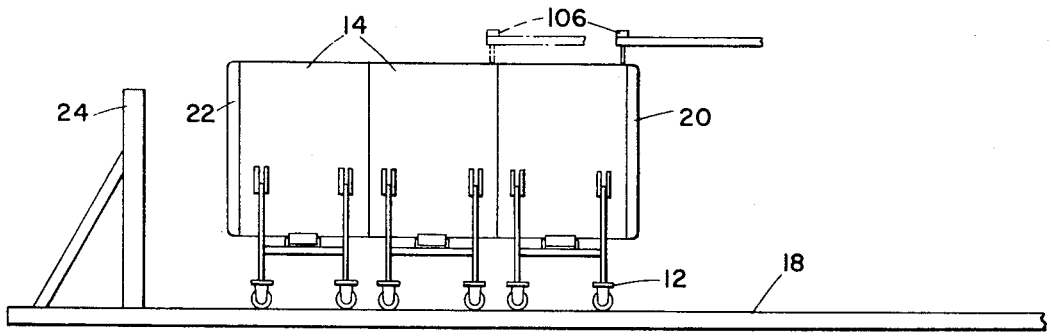
Figure 6:
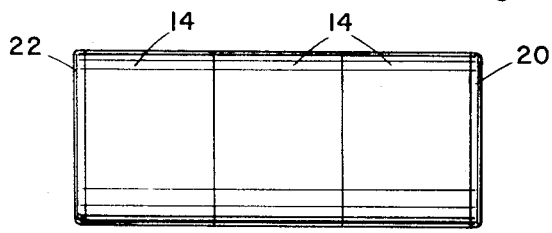
FIG. 6 illustrates a tank fabricated in accordance with the invention.

The final configuration of the tank is first achieved in the position illustrated in FIG. 5b, where the hydraulic ram 58 has been actuated to extend the flange 56 carrying the end plate 20 and force that end plate over the flange 128 and to force the successive flanges into the flange receiving portions of the adjacent tank section or end plate.

Hydraulic pressure is maintained on the ram 58 to hold the tank in its final configuration while a series of tack welds are made around the periphery of each joint so as to assure the security of the configuration.

The carriage 16 carrying the hydraulic ram may then be backed away, after releasing of the hydraulic pressure and the retraction of the flange. Additionally, the upper semi-circular members may be released from their circular restraint function to retract into the position shown in FIG. 4. Whereupon, the automatic welder may be brought into position over each joint and the roller actuating cylinder activated to raise the tank from the lower semi-circular members and into a rotatable position where it is in contact only with the rollers. The motor, or other device for rotating the tank, is activated and the joints rotated under the automatic welder which is turned on to make the continuous seam weld. The weld requires no backing plate because of the utilization of the flange configuration which ensures that each joint will be backed by a solid piece of metal and thereby eliminate the requirement for a backing plate.

The welding process continues as the automatic welder is moved to successive joints until a continuous seam weld has been made around the entire periphery of each joint. The tank is then in its final completed configuration and is ready for installation.

Having described my invention, I now claim.

1. A tank fabrication system comprising,
   guide means for maintaining a plurality of approximately circular tank sections in approximate axial alignment,
   first means for forcing each of said sections to assume a substantially circular cross sectional configuration,
   second means for moving and holding said sections in contact,
   third means for securing each of said sections to the adjacent section,
   said guide means comprising track means for receiving supporting carriage means,
   supporting carriage means for supporting said sections and having said first means mounted thereon,
   said second means comprising stop means for limiting the movement of said carriage on said guide means,
   one of said stop means being engageable with mechanical means for moving said sections into contact,
   said mechanical means comprising an endless chain mounted below said carriage and said stop means and engaging said chain for moving said sections into contact. contact.

* * * * *